(12) United States Patent
O'Gwynn (10) Patent No.: US 9,443,275 B1
(45) Date of Patent: Sep. 13, 2016

(54) FACILITATING ORDERING AT AN ORDER POINT VIA SMART ORDERING DEVICES

(71) Applicant: HM Electronics, Inc., Poway, CA (US)

(72) Inventor: David O'Gwynn, Ramona, CA (US)

(73) Assignee: HM ELECTRONICS, INC., Poway, CA (US)

( * ) Notice: Subject to any disclaimer, the term of this patent is extended or adjusted under 35 U.S.C. 154(b) by 388 days.

(21) Appl. No.: 14/185,844

(22) Filed: Feb. 20, 2014

(51) Int. Cl.
  *G06Q 30/00* (2012.01)
  *G06Q 50/00* (2012.01)
  *G06Q 50/12* (2012.01)
  *G06Q 20/32* (2012.01)

(52) U.S. Cl.
  CPC ............ *G06Q 50/12* (2013.01); *G06Q 20/327* (2013.01)

(58) Field of Classification Search
  USPC ....................................................... 705/15, 16
  See application file for complete search history.

(56) References Cited

U.S. PATENT DOCUMENTS

| | | | |
|---|---|---|---|
| 6,574,603 B1 * | 6/2003 | Dickson et al. | 705/15 |
| 7,359,868 B2 * | 4/2008 | Kirkpatrick | 705/16 |
| 8,200,251 B2 | 6/2012 | Huang | 455/457 |
| 8,639,640 B1 * | 1/2014 | Kadous | 706/12 |
| 8,700,060 B2 | 4/2014 | Huang | 455/456.1 |
| 2008/0218313 A1 | 9/2008 | D'Hont et al. | 340/10.1 |
| 2009/0140921 A1 * | 6/2009 | Bongfeldt et al. | 342/372 |
| 2010/0025545 A1 * | 2/2010 | Koval | 246/107 |
| 2011/0102156 A1 | 5/2011 | Gravelle et al. | 340/10.6 |
| 2012/0309293 A1 * | 12/2012 | Kummetz et al. | 455/11.1 |
| 2013/0024299 A1 | 1/2013 | Wong et al. | 705/15 |
| 2013/0103200 A1 * | 4/2013 | Tucker et al. | 700/275 |
| 2013/0143590 A1 * | 6/2013 | Sridhara et al. | 455/456.1 |
| 2014/0051348 A1 * | 2/2014 | Chow et al. | 455/7 |
| 2014/0114778 A1 | 4/2014 | Miller et al. | 705/16 |
| 2014/0300467 A1 * | 10/2014 | Ho | 340/539.13 |

* cited by examiner

*Primary Examiner* — Ariel Yu
(74) *Attorney, Agent, or Firm* — Sheppard Mullin Richter & Hampton LLP (57) ABSTRACT

A system and method for facilitating ordering at an order point using a smart ordering device are disclosed. A primary transmitting device and a secondary transmitting device may be positioned opposite of one another at the order point. A short distance linkage may be established between the primary and secondary transmitting device. A disruption of the linkage may be detected when an object carrying a smart ordering device passes through the order point. Information indicating the disruption may be included in a signal transmitted by the primary transmitting device to the smart ordering device. Based on such information and the signal strength of the signal from the primary transmitting device, the smart ordering device may determine it is at the order point. In response to such determination, the smart ordering device may generate and communicate an order request to a remote server for placing an order.

20 Claims, 7 Drawing Sheets

FACILITATING ORDERING AT AN ORDER POINT VIA SMART ORDERING DEVICES

FIELD OF THE DISCLOSURE

This disclosure relates to facilitating placing orders by customers using smart ordering device at a point of order in a first come first served fashion.

BACKGROUND

Conventional intercom systems in a drive-thru lane facilitating two-way voice communications between customers and order takers at a speaker post or menu board are known. These systems typically employ a microphone for recognizing customer's voice and a speaker at the same location to facilitate the two-way voice communication. These systems typically require the customer to stop at an order location and speak with the order taker to place an order. In these systems, the individual customer orders are assembled in the same sequence the orders are made at the point of an order in a first come first served fashion.

Online ordering systems are known. In those systems, a customer typically makes an order using a web page and picks up the ordered merchandise in a physical retail store with proper identification. For example, the customer will announce to a clerk in a store upon his arrival that he has ordered merchandise online. Such online ordering system essentially provides computer connection to a point-of-sale (POS) system and the orders are typically received in a sequence that is not necessarily the same as the sequence of arrival of the customers at the store.

SUMMARY

One aspect of the disclosure relates to identifying when a smart ordering device is at a particular location ready to place an order. As used herein, an "order point" may refer to a known location along a pathway in which vehicles queue for a drive through service line (e.g., food service and/or other service). By way of non-limiting example, the "order point" may refer to the location at which a menu board, an intercom, and a user interface device (e.g., a screen, keypad, and/or other user interface devices) are situated. A configuration of two or more transmitting devices may be positioned at and/or near the order point. The implementation of multiple transmitting devices may facilitate confirming and/or determining which of multiple objects (e.g., vehicles) carrying smart ordering devices queuing along the pathway is actually positioned at the order point at a given time. In some examples, the transmitting devices may include low power radio signal transmitters and receivers. Two of the transmitting devices may be positioned opposite of one another within a short distance at the order point. Linkage between these two transmitting devices may be established wirelessly. A detection of disruption of this linkage may indicate an object carrying a smart ordering device is at the order point blocking the communication channel(s) between the transmitting devices. One of the transmitting devices may be configured to transmit signals indicating such linkage disruption to the smart ordering device in that object. The smart ordering device may be configured to determine it is at the order point based on such signals and as well as by comparing signal strength from other transmitting devices positioned near the order point. In response to a determination that it is at the order point, the smart ordering device may generate and transmit an order request and/or order information to a remote server for placing an order. In some examples, two-way voice communication between a customer associated with the smart ordering device and an operator associated with the order point may be established to facilitate the placement of the order. In some examples, this may facilitate drive-thru ordering by enabling customers to place orders at the order point via a smartphone capable of receiving signals from the transmitting devices without having to speak through a microphone in the conventional intercom system. This may enhance user experience in placing an order at an order point by enabling the users to use smart ordering devices such as smart phones.

A system configured for facilitating ordering at an order point using smart ordering device may include a primary transmitting device and a secondary transmitting device positioned at and/or near an order point, a smart ordering device carried by an object passing through the order point, a remote server facilitating order placement and/or dispatching, and any other components.

In implementations, the smart ordering device may include an antenna, circuitry, and any other components for receiving signals from the primary transmitting device positioned at or near the order point and transmitting order information to the remote server. The smart ordering device may be equipped with a processor configured to run program components, which may include a signal reception component, a signal processing component, a threshold component, an order point determination component, a status information generation component, an order component, and any other components.

The signal reception component may be configured to receive signals from one or more transmitting devices. In some implementations, the signal reception component may be configured to activate—i.e., wake up—the smart ordering device from a sleep mode. For example, upon detection and reception of the signal from the primary transmitting device positioned at or near the order point, the signal reception component may put the smart ordering device in operation mode.

The signal processing component may be configured to process signals received by the signal reception component. The signal processing by the signal processing component may involve extracting encoded information in the received signals by recognizing modulations of the received signals. For example, the signal processed by the signal processing component may include extracting information indicating strength of the signals. The processing of signals received from a given transmitting device by the signal processing component may include obtaining or determining strength of the signals received by the signal reception component. In some embodiments, the signal processing component may be configured to measure time of arrival difference between any two given signals from a transmitting device. This approach is commonly known as "time-of-flight" in the art. In those embodiments, such signal arrival time difference measurements by the signal processing unit may be used to gauge the distance of the transmitting device from the smart ordering device.

The threshold component may be configured to obtain signal thresholds associated with individual transmitting devices for determining whether the smart ordering device is within a predetermined range of the individual transmitting device. The thresholds associated with the individual transmitting devices as obtained by the threshold component may include signal strength thresholds, distance thresholds, and/or any other type(s) of threshold associated with the transmitting device. A signal threshold such as an RSSI threshold value may be obtained by the threshold component for association with a given transmitting device. Such an association may be used for determining whether the smart ordering device is within a predetermined range of the given transmitting device. In some implementations, the threshold component may be configured to obtain threshold values associated with individual transmitting devices. In those implementations, the threshold component may be configured to adjust the threshold values dynamically based on a learning algorithm preconfigured with the threshold component.

The order point determination component may be configured to determine whether the smart ordering device containing the order point determination component is at the order point. In some embodiments, the order point determination component may be configured to make such a determination based on the distance gauged by the signal processing component and the distance thresholds obtained by the threshold component. In some embodiments, the order point determination component may be configured to make such a determination based on a comparison between the threshold values obtained by the threshold component and the RSSI value obtained by the signal processing component, and further based on the encoded information included in the signal(s) received from the primary transmitting device.

The status information generation component may be configured to generate status information indicating whether the smart ordering device is at the order point in response to the determination indicating such by the order point determination component. The status information generated by the status information generation component may include identification associated with the smart ordering device that is at the order point as determined by the order determination component. The identification may include, but not limited to, a unit ID such as a serial number associated with the smart ordering device, a telephone number associated with smart ordering device, a name (e.g., a name of a customer) associated with the smart order device, and/or any other types of identification. The status information generated by the status information generation component may be transmitted to the primary transmitting device and/or a remote server. In some embodiments, the generated status information may be broadcast from the smart ordering device at the order point so that other nearby smart ordering devices may be informed of the presence of the smart ordering device at the order point.

The order component may be configured to generate and communicate order information with a remote server in response to the determination that the smart ordering device is at the order point by the order determination component. To do this, the order component may be configured to initiate an order request to the remote server in response to the determination that the smart ordering device is at the order point by the order determination component. In some examples, a two-way voice communication may be established between an operator associated with the order point and a customer associated with the smart ordering device by the order component. For instance, in response to the dialing of a telephone number by the smart ordering device, an operator may answer the call and start the two-way voice communication with the customer associated with the smart ordering device. In another example, the two-way voice communication may be initiated via a conventional intercom system located at or near the order point. For instance, the two-way voice communication with the smart ordering device may be established by dialing a telephone number associated with the smart ordering device through the intercom system in response to an order request from the smart ordering device. In some embodiments, the order component may be configured to present or effectuate presentation of an order menu to the customer associated with the smart ordering device on a display associated with the smart ordering device. Through the display, e.g., a touchscreen, the customer may select choices and place an order via the order menu. The choices selected by the customer for the order may be transmitted, along with other information such as the customer identification and location of the order point, to the remote server via data communication. In some implementations, the order component may be configured to generate information indicating the order has been completed in response to conclusion of communications between the remote server and the smart ordering device. Such information may be transmitted to the primary transmitting device and/or the remote server, or may be broadcast to other smart ordering devices nearby.

The primary transmitting device may include a transceiver, power supply and any other component. Some examples of the transceiver may include, but not limited to, Bluetooth Low Energy, UWB (ultra-wideband), FM, RFID, NFC, Wi-Fi, or any other types of wireless transceiver capable of transmitting data to the smart ordering device. In some embodiments, the transceiver in the primary transmitting device may be configured to receive signals from the secondary transmitting device. In some other embodiments, the primary transmitting device may include an additional receiver, such as a short distance radio receiver, optical beam receiver, or any other types of receivers capable of receiving short distance signals from the secondary transmitting device nearby. The secondary transmitting device may include a short distance signal transmitter configured to transmit signals that may be received by the primary transmitting device.

These and other features and characteristics of the present technology, as well as the methods of operation and functions of the related elements of the structure and the combination of parts and economies of manufacture, will become more apparent upon consideration of the following description and the appended claims with reference to the accompanying drawings, all of which form a part of this specification, wherein like-reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1A:
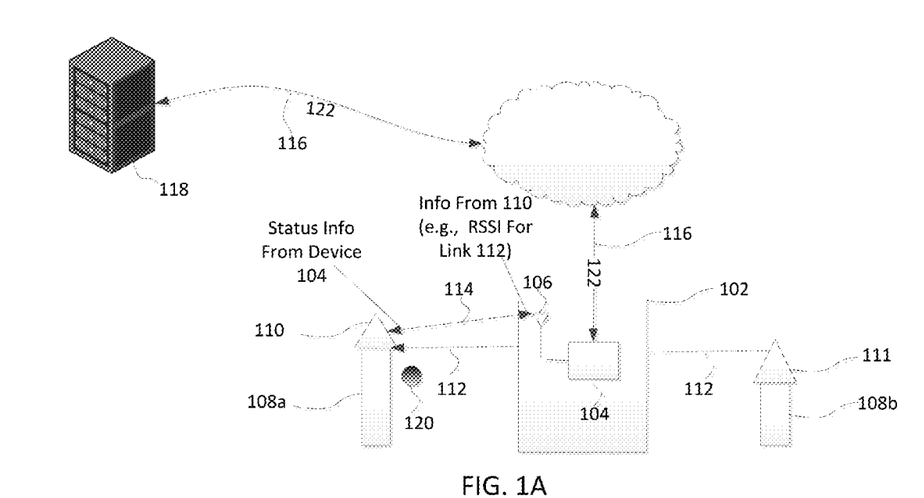
FIG. 1A is a perspective view illustrating generally one example of determining an object at an order point in accordance with the disclosure.

FIG. 1A is a perspective view illustrating generally one example of determining an object is at an order point in accordance with the disclosure. As shown, for determining whether an object 102 is at an order point 120, transmitting devices such as transmitting devices 110, 111 (further details illustrated in FIGS. 4A and 4B) may be positioned opposite of one another at the order point 120. In this example, as shown, the transmitting devices 110 and 111 are placed on posts 108a and 108b, respectively. However, this is not intended to be limiting. Other suitable placements of the transmitting devices 110 and 111, such as embedded in building structures or menu boards, are contemplated. In this example, the transmitting device 110 is a primary transmitting device and the transmitting device 111 is a secondary transmitting device. As shown, a link 112 may be established between the primary transmitting device 110 and the secondary transmitting device 111. The link 112 may be a radio link, optical link, sound link or any other type of link suitable for establishing short distance linkage between the primary transmitting device 110 and the secondary transmitting device 111. In some embodiments, the link 112 may be a short distance radio link such that the primary transmitting device 110 receives radio signals transmitted from the secondary transmitting device 111. In some embodiments, the link 112 may be an optical link such that the primary transmitting device 110 receives optical beams from the secondary transmitting device 111. The distance between the transmitting devices 110 and 111 as they are positioned for the order point 120 may be determined by the transmitting power of the secondary transmitting device 111 and as well as the size of the object 102. In implementations, the distance between the transmitting devices 110 and 111 may be adjusted by adjusting the transmitting power of the secondary transmitting device 111. For example, for facilitating a large-sized object 102 such as a car, the transmitting power of the secondary transmitting device may be increased as compared to that for facilitating a small-sized object such as a person.

The link 112 between the transmitting devices 110 and 111 may be disrupted by the object 102 when the object 102 is at the order point 120. Such disruption may be primarily due to the object 102 partially blocking communication channel(s) needed by link 112. In embodiments in which the link 112 is a radio link, such disruption may result in the radio signal strength received by the primary transmitting device 110 from the secondary transmitting device 111 being weakened. In embodiments in which the link 112 is an optical link, such disruption may result in the optical beam(s) received by the primary transmitting device 110 from the secondary transmitting device 111 being interrupted. The primary transmitting device 110 may be configured to detect such disruption in the link 112 when the object 102 is at the order point 120. For example, the primary transmitting device 110 may be configured to detect a decrease of radio signal strength from the secondary transmitting device 111. In some embodiments, to minimize cross-interference and to maximize signal disruption by the object 102, the secondary transmitting device 111 may be placed closer to the ground than the primary transmitting device 110.

As shown, the primary transmitting device 110 may be configured to transmit signals for reception by the object 102 via a link 114. The link 114 may be any suitable wireless communications, such as, but not limited to, Bluetooth, Bluetooth Low Energy (BLE), radio frequency, FM frequency, Wi-Fi, or any other types of wireless communications. For example, in one embodiment, the link 114 is a BLE link, and the primary transmitting device 110 may include a BLE transceiver to send/receive small amounts of data via the BLE link 114 to the smart device 104. BLE technology typically permits temporary connections between devices without the need to pair them in advance.

In some embodiments, the primary transmitting device 110 may be configured to transmit signals on the link 114 periodically (e.g., once every ¹⁄₁₆ second, every half second, every second and so on). The periodically transmitted signals by the primary transmitting device 110 may include information indicating the strength of the signals as received by the primary transmitting device 110 from the secondary transmitting device 111 via the link 112. For example, the primary transmitting device 110 may be configured to transmit signals (e.g., broadcast) to link 114 indicating that the signal strength (e.g., numerical values) as received by the primary transmitting device 110 from the secondary transmitting device 111 via the link 112. In another example, the signals transmitted by the primary transmitting device 110 via the link 114 may include information indicating whether the signal strength as received by the primary transmitting device 110 from the secondary transmitting device 111 via the link 112 is decreased or disrupted. For example, a special code, e.g., "001", may be used to designate a decrease of signals or interruption of the link 112, while "000" may be used to designate the link 112 is in a normal communication state. In some embodiments, the signals transmitted by the primary transmitting device 110 may include information indicating a battery level of the secondary transmitting device 111. In those embodiments, the signals (e.g., radio signals) transmitted from the secondary transmitting device 111 to the primary transmitting device 110 may include information indicating the battery level of the secondary transmitting device 111.

As still shown in FIG. 1A, object 102 may be equipped with a smart ordering device 104 (further details illustrated in FIG. 2), which is operatively coupled to an antenna 106. In some embodiments, the antenna 106 may be part of the smart ordering device 104. In some other embodiments, the antenna 106 may be a separate component from the smart ordering device 104 and connected to the smart ordering device 104 externally via a suitable wired or wireless connection. In any case, the antenna 106 may be configured to receive signals transmitted from the primary transmitting device 110 via the link 114 and forward the received signals to the smart ordering device 104. The smart ordering device 104, as will be described in FIG. 2, may be configured to process the signals from the primary transmitting device 110. In some embodiments, the smart ordering device 104 may be configured with components and values for determining the strength of the signals from the primary transmitting device 110. In this way, the smart ordering device 104 may determine whether it is at or in close proximity to the primary transmitting device 110 at the order point 120. The signal processing by the smart ordering device 104 may include extracting the encoded information in the signals received from the primary transmitting device 110 regarding the signal strength as received from the secondary transmitting device 111 by the primary transmitting device 110 via the link 114, and determining whether the extracted encoded information indicates the signal strength as received from the secondary transmitting device 111 by the primary transmitting device 110 via the link 114 is interrupted or decreased. In the case where the smart ordering device 104 determines the signal strength from the primary transmitting device 110 is strong (i.e., above a signal strength threshold) and the encoded information in the signals from the primary transmitting device 110 indicates that the signal strength as received from the secondary transmitting device 111 by the primary transmitting device 110 via the link 114 is decreased or interrupted, the smart ordering device 104 may determine that it is at or near the order point 120.

In response to such a determination, the smart ordering device 104 may be configured to generate status information indicating that it is at the order point 120. The generated status information by the smart ordering device 104 may include identification (e.g., a unit ID) associated with the smart ordering device 104. In some embodiments, the generated status information may be transmitted to the primary transmitting device 110 via the link 114 to announce that object 102 is at the order point 120. In some embodiments, the generated status information may be transmitted to a remote server such as the remote server 118 shown in FIG. 1A via link 116. In some embodiments, the primary transmitting device 110 may transmit (e.g., broadcast) such status information from the smart ordering device 104 to other smart ordering devices nearby so that the other smart ordering devices may be informed that the smart ordering device 104 is at the order point 120.

Figure 1B:
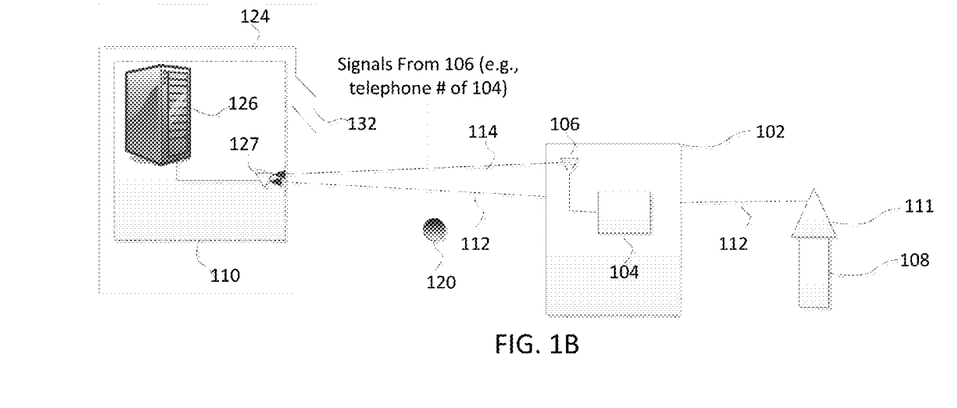
FIG. 1B illustrates another example of determining the smart ordering device is at the order point in accordance with the disclosure.

In some implementations, the determination of whether a smart ordering device is present at the order point 120 may be performed at a device associated with the order point 120. FIG. 1B illustrates another example of determining the smart ordering device is at the order point in accordance with the disclosure. As shown in this example, the primary transmitting device 110 may include a computer 126 and an antenna 127 adapted to receive signals from the secondary transmitting device 111 and the smart ordering device 104. The computer 126 may include or be operatively coupled to a point of sale (POS) system and may be located inside an order taking station 124 next to or in close proximity to order point 120. In this example, as shown, the signals received from the antenna 127 may be passed to computer 126 via any suitable communication channel between the antenna 127 and the computer 126. As shown, the signal from the smart ordering device 104 may include information 130 indicating a telephone number associated with the smart ordering device 104 and any other information. In that example, based on the disruption of the link 112 detected by the primary transmitting device 110 and the RSSI of the signal from the smart ordering device 104, the computer 126 may determine that the smart ordering device 104 is at the order point 120. In response to such a determination, the computer 126 may be configured to dial the telephone number transmitted from the smart ordering device 104 to initiate a two-way voice communication with the customer associated with the smart ordering device for order placement. As shown, after placing an order, the customer may retrieve the ordered merchandise (e.g., food) from the window 132 of the order take station 124.

Figure 1C:
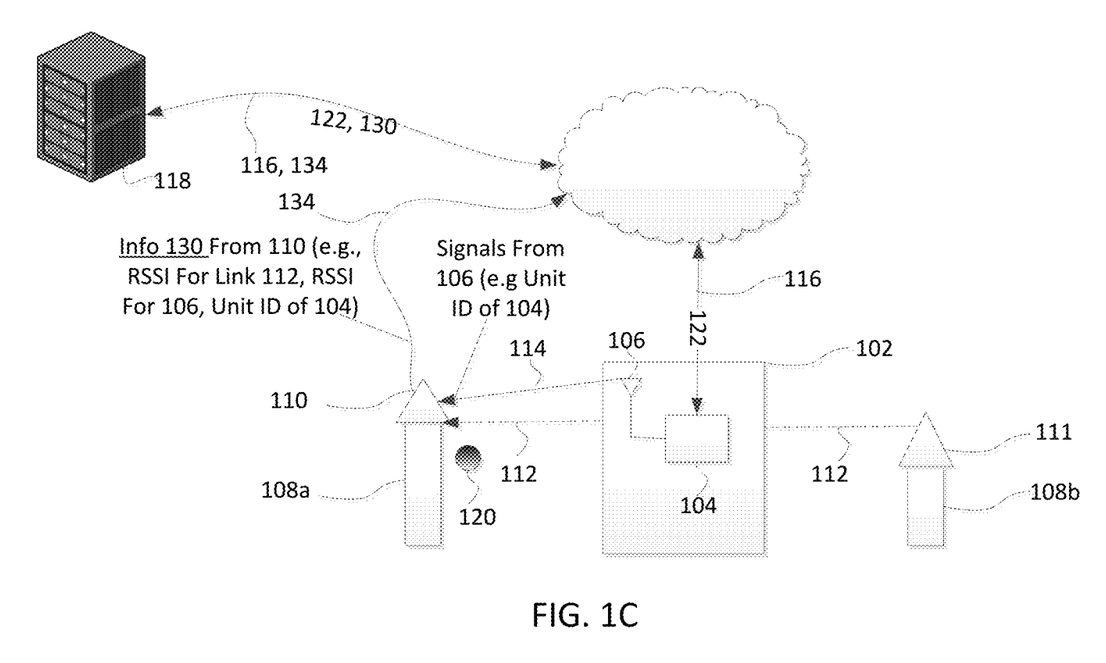
FIG. 1C illustrates still another example of determining the smart ordering device is at the order point in accordance with the disclosure.

FIG. 1C illustrates still another example of determining a smart ordering device is at an order point in accordance with the disclosure. As shown in this example, the primary transmitting device 110 may be operatively connected to a remote server 118 via a suitable link 134. In this example, as shown, the primary transmitting device may be configured to receive signals from the smart ordering device 104 and the secondary transmitting device 111. The signals from the smart ordering device 104 may include information indicating a unit ID and/or any other identification associated with the smart ordering device 104 or a customer. As illustrated in FIG. 1C, the primary transmitting device 110 may be configured to communicate information 130 to the remote server 118 via the link 134. The information 130, as illustrated, may include, but not limited to, information regarding RSSI for the link 112, the identification information from the smart ordering device 104, RSSI for the signal transmission from the smart ordering device 104, and/or any other information. In this example, the server 118 is configured to process the information 130 from the primary transmitting device 110 and determine that the smart ordering device 104 is at the order point 120.

Returning to FIG. 1A, the smart ordering device 104 may be configured to generate and communicate order information 122 with the remote server 118 via any suitable wireless link 116 in response to the determination that the smart ordering device 104 is at order point 120. The link 116 between the server 118 and smart ordering device may include wired and/or wireless segments. The wireless segments of link 116 may include cellular network, Bluetooth connection, Wi-Fi connection, and/or any other types of wireless communications. The order information 122 may include order requests (e.g., request for a telephone number associated with the store next to the order point 120), location of the particular order point 120, selections of merchandise by customers associated with the smart ordering device 104, identification associated with the customers and/or the smart ordering devices, and/or any other information.

In some embodiments, the server 118 may be a Point of Sale (POS) system located inside a building close to the order point 120, e.g., a drive-thru order taking station inside a restaurant next to the order point 120. In those embodiments, the server 118 may be configured to place an order from the customer associated with the smart ordering device 104 as indicated by the received order information 122 in a first come, first served sequence commonly used for taking drive-thru orders. However, it should be understood that this is not necessarily the only case. In some embodiments, the server 118 may be located remotely in a data center, customer service center, cloud or any other type of remote location configured to process and/or dispatch order information 122 from the smart ordering device 104. For example, the server 118 may be located in a data center and configured to process and dispatch the order information 122 to retailer stores to facilitate online-to-offline transactions (O2O).

The communication between the smart ordering device 104 and the server 118 may include data transmission (e.g., such as the order information from smart ordering device 104), and/or two-way voice communication. An operator associated with the order point 120 may initiate a two-way communication with a customer associated with the smart ordering device 104 when the smart ordering device is at the order point 120. In some embodiments, the two-way voice communication between the customer and the operator may be via the link 116. For example, the operator may initiate the two-way voice communication via a telephone, intercom system, a computer equipped with headsets, and/or any other type of device via the link 116 (e.g., dialing a telephone number of the smart ordering device or through a voice-over-IP communication). In some other embodiments, the two-way voice communication between the customer and the operator may be via the link 114. For example, the operator may initiate the two-way voice communication via an intercom, a POS terminal and/or any other type of devices via signals on the link 114. In yet some other examples, the operator may simply initiate the two-way voice communication through the speaker/microphone of the conventional intercom system with the customer. It should appreciated in some implementations, the customer may initiate the two-way voice communication with the operator in manners described above.

Figure 2:
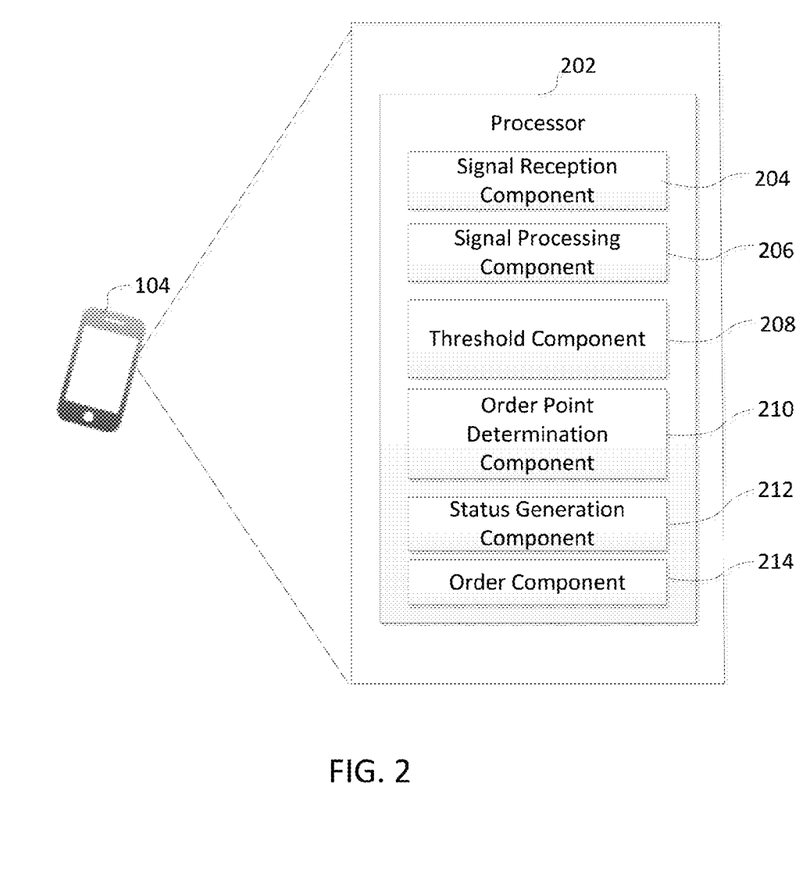
FIG. 2 illustrates one example of functional components included in a smart ordering device shown in FIG. 1A.

FIG. 2 illustrates one example of functional components included in a smart ordering device shown in FIG. 1A. In implementations, the smart ordering device 104 may include, but not limited to, a smart phone, a laptop computer, a tablet, a Netbook, a console in a vehicle, a set top box, a dedicated device having functions attributed to the smart ordering device 104 described herein, or any other types of device. As described above, the smart ordering device 104 may include an antenna 106 shown in FIG. 1A, circuitry, and any other components for receiving signals from the primary transmitting device 110 via the link 114. For example, in one implementation, the smart ordering device 104 is a smart phone 104 equipped with a receiver and circuitry configured to receive and process BLE signals from the primary transmitting device 110. In any case, as shown, the smart ordering device 104 may be equipped with a processor 202 configured to run program components. As shown in this example, the program components may include a signal reception component 204, a signal processing component 206, a threshold component 208, an order point determination component 210, a status information generation component 212, an order component 214 and any other components.

The signal reception component 204 may be configured to receive signals from one or more of a transmitting device such as the primary transmitting device 110 shown in FIG. 1. In implementations, the signal reception component 204 may be configured to periodically poll the antenna 106, data bus from the antenna, registers (e.g., such as cache or dedicated registers), internal memory (e.g., such as an on-chip memory) and/or any other components within or connected to the smart ordering device 104 to receive signals from the primary transmitting device 110. In some implementations, the smart ordering device 104 may operate in a sleep mode until the signals are received by the signal reception component 204 to conserve power. In those implementations, the signal reception component 204 may be configured to activate (i.e., wake up the smart ordering device 104 from the sleep mode) the smart ordering device 104. For example, upon detection and reception of the signals from the primary transmitting device 110, the signal reception component 204 may put the smart ordering device in operation mode.

The signal processing component 206 may be configured to process signals received by the signal reception component 204. The signal processing by the signal processing component 206 may involve extracting encoded information in the received signals by recognizing modulations of the received signals. In some embodiments, the signal processing component 206 may be configured to process signals from more than one transmitting device. In those examples, the signal processing component 206 may be configured with multiple signal characteristics (such as signal frequencies, access codes, addresses and/or any other signal characteristics) associated with the individual transmitting devices for processing the signal received from those transmitting devices.

In any case, the processing of signals received from a given transmitting device by the signal processing component 206 may include extracting information embedded in those signals. For example, as described above, the primary transmitting device 110 may include information regarding the strength of the signals received by the primary transmitting device 110 from the secondary transmitting device 111 via the link 112. In that example, the signal reception component 206 may be configured to extract that information from the signals received from the primary transmitting device 110. In some implementations, the signal processing component 206 may be configured to obtain or determine the strength of the signals received from a given transmitting device. For example, the signal processing component 206 may be configured to obtain a received signal strength indication (RSSI) for the signals received from the primary transmitting device 110. An RSSI is typically a numerical value and may be obtained from circuitry performing intermediate frequency processing. Other information in the signals from a given transmitting device may include, but not limited to, information regarding battery level, operating status, unit ID associated with the transmitting device, and/or any other information. For example, as described above, information in the signals transmitted by the primary transmitting device 110 may include information indicating a battery level of the secondary transmitting device 111. In that example, the signal processing component 204 may extract such battery information from the signals from the primary transmitting device 110. The extracted battery information may be transmitted to the remote server 118 for determination whether the battery for a particular transmitting device (e.g., the secondary transmitting device 111) needs to be replaced.

In some embodiments, the signal processing component 206 may be configured to measure time of arrival difference between any two given signals from a transmitting device. This approach is commonly known as "time-of-flight" in the art. In those embodiments, such signal arrival time difference measurements by the signal processing unit may be used to gauge the distance of the transmitting device transmitting the signals from the smart ordering device 104.

The processor 202 may include a threshold component 208 configured to obtain thresholds associated with individual transmitting devices for determining whether the smart ordering device is within a predetermined range of the individual transmitting devices. The thresholds associated with the individual transmitting devices as obtained by the threshold component 206 may include signal strength thresholds, distance thresholds, and/or any other type(s) of threshold associated with the transmitting device. For example, in some embodiments in which the "time-of-flight" approach is employed, the thresholds obtained by the threshold component 206 may include distance thresholds indicating that corresponding transmitting devices are within the threshold distances from the smart ordering device 104. For instance, such thresholds may be used to indicate the smart ordering device is within X or less feet from transmitting device 1, but is at least Y feet away from transmitting device 2 and is at least Z feet away from transmitting device 3, and so on.

In some embodiments in which the RSSI obtained or determined by the signal processing component 206 is used to determine the distance between the smart ordering device 104 and a transmitting device, the thresholds obtained by the signal strength signal component 208 may include signal strength thresholds corresponding to the individual transmitting devices. In general, the higher the RSSI value, i.e., the stronger the signal is, the smaller the distance is between the smart ordering device 104 and the given transmitting device. A signal threshold such as an RSSI threshold value may be obtained by the threshold component 208 for association with the given transmitting device. Such an association may be used for determining whether the smart ordering device 104 is within a predetermined range of the given transmitting device. By way of non-limiting example, an RSSI threshold value may be obtained by the threshold component 208 for association with the given transmitting device. This RSSI threshold value may be used, for example, by the order point determination component 210 for determining whether the smart ordering device is within a predetermined range of the primary transmitting device 110.

In some implementations, the threshold component 208 may be configured to dynamically adjust threshold values associated with individual transmitting devices based on a learning algorithm preconfigured with the threshold component 208. By way of non-limiting example, a RSSI threshold may be associated with a first transmitting device, and another RSSI threshold may be associated with a second transmitting device. In that example, the RSSI threshold associated with the first transmitting device may be adjusted dynamically by the threshold component 208 based on the second RSSI threshold value. For instance, if the RSSI from the first transmitting device is above the first RSSI threshold by 50, and the RSSI from the second transmitting device is above the second RSSI threshold device by 20, the threshold component 208 may be configured to increase the first RSSI threshold and/or second RSSI threshold for achieving a more accurate in-range measurement. In some examples, the distances between any two transmitting devices may be stored in a distance matrix stored on the smart ordering device 104. Based on such a distance matrix, the threshold component 208 may be configured to adjust the RSSI threshold values associated with the individual transmitting devices.

The order point determination component 210 may be configured to determine whether the smart ordering device 104 containing the order point determination component 210 is at the order point, such as the order point 120 illustrated in FIG. 1A. In some embodiments in which the "time-of-flight" approach is used, the order point determination component 210 may make such a determination based on the distance gauged by the signal processing component 206 and the distance thresholds obtained by the threshold component 208. By way of non-limiting example, in those embodiments, if the signal processing component 206 gauges the smart ordering device 104 is X feet away from the primary transmitting device 110 and the distance threshold associated with the primary transmitting device 110 as obtained by the threshold component 208 is X+d feet, where d>0, the order point determination component 210 may determine that the smart ordering device 104 is at the order point 120 if the information in the signals from the primary transmitting device 110 also indicates that the link 112 is being disrupted. As described above, such a determination is based on the fact that the object 102 is disrupting or blocking the link 112 between the transmitting devices 110 and 111 while being within a predetermined range of the primary transmitting device 110. Such a situation may happen only when the object 102 (carrying the smart ordering device 104) is at the order point 120.

Figure 3:
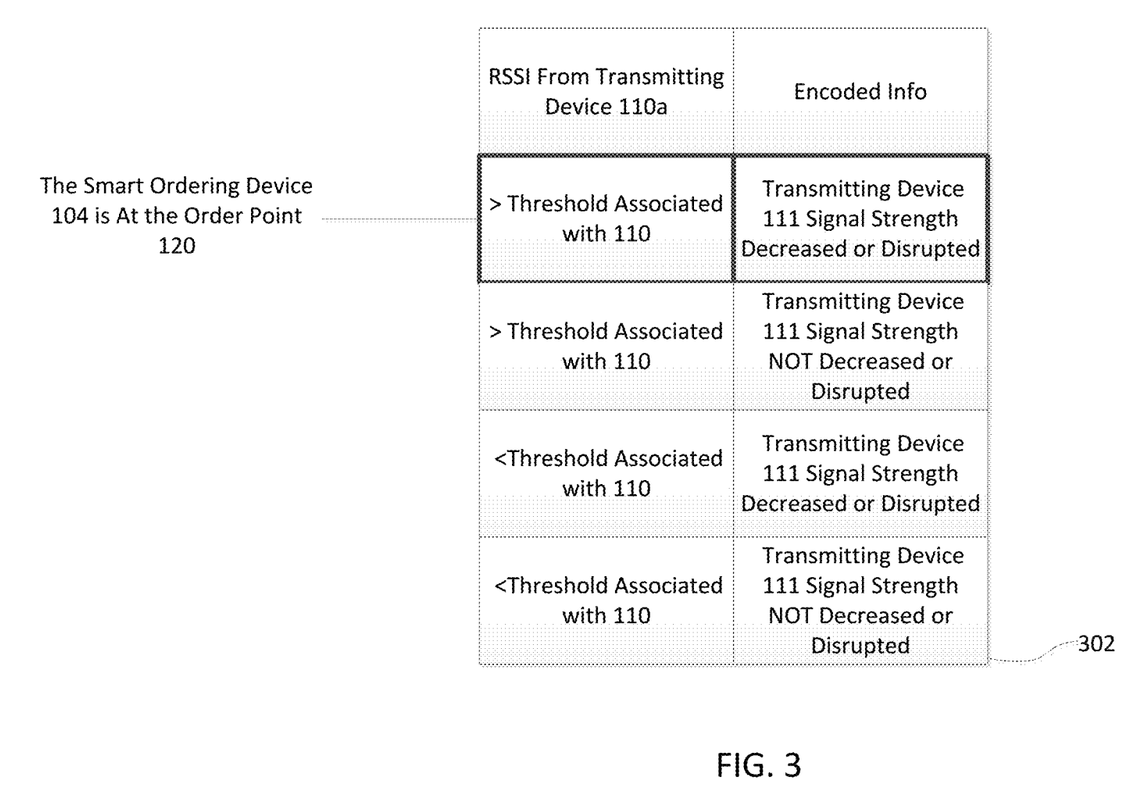
FIG. 3 illustrates one example of a determination table for determining whether the smart ordering device shown in FIG. 1A is at an order point.

In some embodiments in which the RSSI approach is used, the order point determination component 212 may be configured to make the determination whether the smart ordering device 104 is at the order 120 based on a comparison between the signal strength thresholds obtained by the threshold component 208 and the RSSI value obtained by the signal processing component 206, and further based on the encoded information included in the signal(s) received from the primary transmitting device (transmitting device 110). FIG. 3 illustrates one example of a determination table that may be configured into the order point determination component 210 for determining whether the smart ordering device 104 is at the order point 120. As shown, the determination table 302 may specify associations between the RSSI strength of the signals transmitted by the primary transmitting device 110 and the encoded information conveyed by the primary transmitting device 110. As illustrated, when an association between the RSSI threshold value being breached (e.g., the smart ordering device 104 is within a predetermined range of the transmitting device 110) and the encoded information indicating that the signal strength between the transmitting devices 110 and 111 being decreased or interrupted, the order point determination component 210 determines that the smart ordering device 104 is at or near the order point 120. As described above, such a determination is based on the fact that the object 102 is disrupting or blocking the link 112 between the transmitting devices 110 and 111 while being within a predetermined range of the primary transmitting device 110. Such a situation may happen only when the object 102 (carrying the smart ordering device 104) is at the order point 120.

The determination table 302 also illustrates other associations between the RSSI detection and the encoded information for the signals received from the primary transmitting device 110. As can be seen in FIG. 3, those associations do not indicate the smart ordering device 104 is necessarily at the order point 120. For example, when the RSSI of the primary transmitting device 110 breaches the threshold value, which means the smart ordering device is within a predetermined range of the primary transmitting device 110, but the encoded information does not indicate the link 112 between the transmitting devices 110 and 111 is decreased or disrupted; this indicates that the object 102 is not blocking the link 112 and therefore is not at the order point 120. In another situation, as shown, the encoded information in the signals from the primary transmitting device 110 may indicate that the link 112 is being disrupted or decreased, but the RSSI of the signals from the primary transmitting device 110 has not breached (i.e., above) the threshold. This indicates that the object 102 is not at the order point 120 and likely some other object is at the order point 120 causing the disruption of the link 112. In any case, based on the determination table 302 shown in FIG. 3, the order point determination component 210 may be configured to determine whether the smart ordering device 104 is at the order point 120.

Returning to FIG. 2, the status information generation component 212 may be configured to generate status information indicating the smart ordering device is at the order point 120 in response to the determination indicating such by the order point determination component 210. The status information generated by the status information generation component 212 may include identification associated with the smart ordering device that is at the order point 120 as determined by the order determination component 210. The identification may include, but not limited to, a unit ID such as a serial number associated with the smart ordering device 104, a telephone number associated with smart ordering device 104, a name (e.g., a name of a customer) associated with the smart order device 104, and/or any other types of identification. The status information generated by status information generation component 212 may be transmitted to the server 118 via the link 116 as illustrated in FIG. 1. In some embodiments, the status information generated by status information generation component 212 may be transmitted to the primary transmitting device 110 via the link 114 as illustrated in FIG. 1A. In some embodiments, the generated status information may be broadcast from the smart ordering device 104 at the order point 120 so that other smart ordering device(s) may be informed of the presence of the smart ordering device 104 at the order point. This may help improve accuracy of determining whether a smart ordering device 104 is at the order point 120. For example, a given ordering device may determine that it is not at the order point 120 based on the status information received from other smart ordering device 104 announcing that the other smart ordering device is at the order point 120.

The order component 214 may be configured to generate and communicate order information with a remote server, such as the server 118 shown in FIG. 1, in response to the determination that the smart ordering device 104 is at the order point by the order determination component 210. In some examples, the order information communicated by the order component 214 may include order requests to the server 118. For example, the order component 214 may be configured to request a telephone number associated with the order point 120 from the server 118. For instance, the server 118 may serve as a dispatch station informing the smart ordering device 104 at the order point 120 of the telephone number for ordering merchandise (e.g., food) from a store (e.g., restaurant) associated with the order point 120 upon the smart ordering device 104 requesting such a telephone number. However, in some other embodiments, such a telephone number may be stored on the smart ordering device 104. In any case, the order component 214 may initiate dialing of the telephone number. In those embodiments, a two-way voice communication may be established between an operator associated with the order point 120 and a customer associated with the smart ordering device 104. For instance, in response to the dialing of the telephone number by the smart ordering device 104, an operator associated with the order point 120 (e.g., a POS) may answer the call and start the two-way voice communication with the customer associated with the smart ordering device 104. In this way, the customer may place an order through the smart ordering device 104 (e.g., a smart phone) to the operator.

In some embodiments, the order component 214 may be configured to present or effectuate presentation of an order menu to the customer associated with the smart ordering device 104 on a display associated with the smart ordering device 104. Through the display, e.g., a touchscreen, the customer may select choices and place an order via the order menu. The choices selected by the customer for the order may be transmitted, along with other information such as customer identification and location of the particular order point 120, to the remote server 118 via data communication. In response to receiving such order data from the smart ordering device 104, the remote server 118 may be configured to place and/or dispatch an order for the customer associated with the smart ordering device 104 automatically. This may facilitate online-to-offline transactions (O2O). For example, a customer may place an order through the smart ordering device 104 (e.g., his/her smart phone) at the order point 120 via data connection to the server 118 and the server 118 automatically places the order information to a sales destination (e.g., a retail store or restaurant located next to the order point 120).

In some implementations for facilitating O2O transactions, the order component 214 may be configured to generate arrival information indicating the smart ordering device 104 is present at the order point 120. In those implementations, the order component 214 may be configured to effectuate transferring of the arrival information including an identification (e.g., a unit ID, a telephone number, a name of the customer and/or any other type(s) of identification) associated with the smart ordering device 104 present at the order point to the server 118 via the link 116 shown in FIG. 1A or the computer 126 shown in FIG. 1B. In some examples, such arrival information may be dispatched to personnel associated with the store or warehouse next to or in proximity to the order point 120 so that merchandise ordered by the customer (e.g., previously online) may be prepared for pickup by the customer.

In some implementations, the order component 214 may be configured to generate information indicating the order has been completed in response to the conclusion of communications between the remote server 118/operator and the smart ordering device 104. For example, in response to a conclusion of the two-way voice communication between the operator associated with the order point 120 and the customer associated with the smart ordering device 104, the order component 214 may generate information indicating the ordering has completed. Such information may be transmitted to the primary transmitting device 110 and/or broadcast to other smart ordering devices nearby. This may enhance accuracy of order point determination by other smart ordering devices.

Figure 4A:
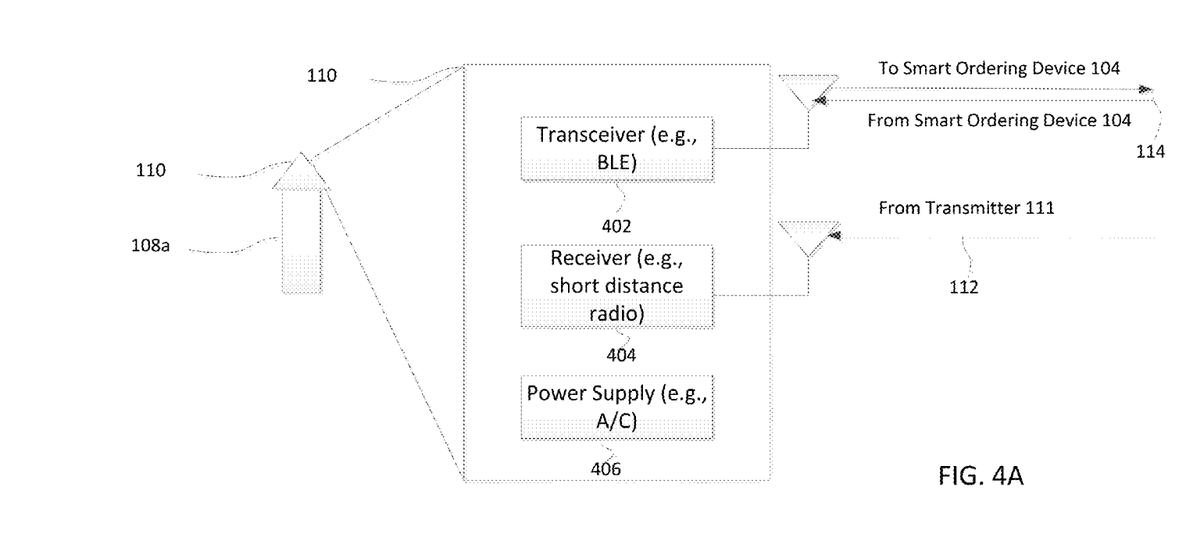
FIG. 4A illustrates an example of a primary transmitting device shown in FIG. 1A.

FIG. 4A illustrates an example of a primary transmitting device, such as the transmitting device 110 shown in FIG. 1A. As shown, the transmitting device 110 may include a transceiver 402, a receiver 404, and power supply 406. In some implementations, the primary transmitting device 110 may include other components such as timing circuit(s), signal modulation circuit(s), microprocessor, just to name a few. In any case, the transceiver 402 may include any wireless transceiver suitable for data transmission. Some examples of the transceiver 402 may include, but not limited to, Bluetooth Low Energy, UWB (ultra-wideband), FM, RFID, NFC, Wi-Fi, or any other types of wireless transceiver capable of transmitting data to the smart ordering device 104. As also shown, the primary transmitter 110 may include a receiver, such as a short distance radio receiver, optical beam receiver, or any other types of receivers capable of the receiving short distance signals from a secondary transmitting device nearby, e.g., the secondary transmitting device 111. It should be understood in some embodiments, receiver 404 may be optional. In those embodiments, the transceiver 402 may be configured to receive signals from the secondary transmitting device 111, and thus the receiver 404 is not included the primary transmitting device 110 in those examples. It should be still understood in some embodiments, transceiver 402 may be optional. For example, in the configuration shown in FIGS. 1B and 1C, the primary transmitting device may include a receiver 404, but not transceiver 402, for receiving signals from the smart ordering device 104 and the secondary transmitting device 111.

Also shown is that the primary transmitting device 110 may include a power supply 406 to provide power for operating the transmitting device 110. In one embodiment, the power supply 406 is an A/C power supply to ensure that the transceiver 402 and receiver 404 can operate continuously without power failure.

Figure 4B:
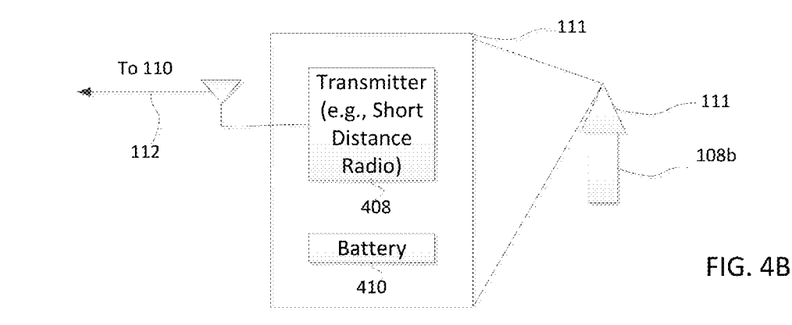
FIG. 4B illustrates an example of a secondary transmitting device, such as the transmitting device, shown in FIG. 1A.

FIG. 4B illustrates an example of a secondary transmitting device, such as the transmitting device 111 shown in FIG. 1A. As shown, the secondary transmitting device 111 may include a short distance signal transmitter configured to transmit signals that may be received by the receiver 404 on the primary transmitting device 110. As also shown, the transmitting device 111 may include a battery source 410 (including solar power) for supplying power to the secondary transmitting device 111. Other components that may be included in the secondary transmitting device, but not shown in FIG. 4B, may include timing circuits, manual switches, and/or any other components.

Figure 5A:
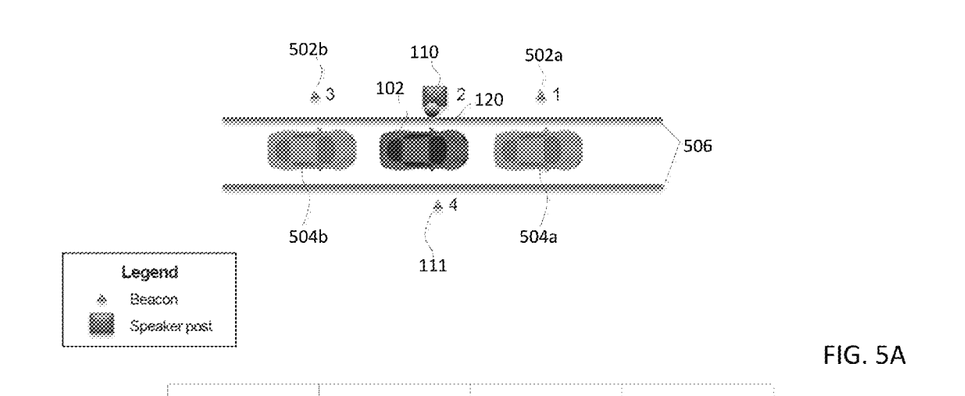
FIG. 5A illustrates an exemplary configuration of transmitting devices for determining whether a car is at an order point in a driving lane.

FIG. 5A illustrates an exemplary configuration of transmitting devices for determining whether a car is at an order point in a driving lane. It will be described with references to FIG. 1A. As illustrated in this exemplary configuration, four transmitting devices may be positioned alongside the driving lane 506. As shown, the primary transmitting device 110 and secondary transmitting device 111 shown in FIG. 1A may be positioned at the order point 120 where the car 102 may transmit order information to the server 118 shown in the FIG. 1A. In this example, as shown, there are two cars, namely cars 504a and 504b, directly behind and in front of the car 102. The cars 102, 502a and 502b may each carry a smart ordering device such as the smart ordering device 104 described herein. As still shown, next to the primary transmitting device 110 are two transmitting devices 502a and 502b. The transmitting devices 502a and 502b may include similar components or substantially similar components to those included in the primary transmitting device 110, except that they are not configured to receive signals from the secondary transmitting device 111. These devices may be powered similarly to the secondary transmitting device 111 (e.g., battery powered, solar powered, or any other type of suitable power). As illustrated, the transmitting devices 502a and 502b are positioned in this example next to the primary transmitting device 110 for improving accuracy of determining whether a given smart ordering device 104 carried by the cars 504a, 504b or 102 is at the order point 120. In general, the positioning of the transmitting devices 502a and 502b may depend on the transmitting ranges of the transceivers within those devices. They are shown in this example being positioned one car length in front of and one car length behind primary transmitter 110 to provide stronger signals to cars 504a and 504b respectively.

Figure 5B:
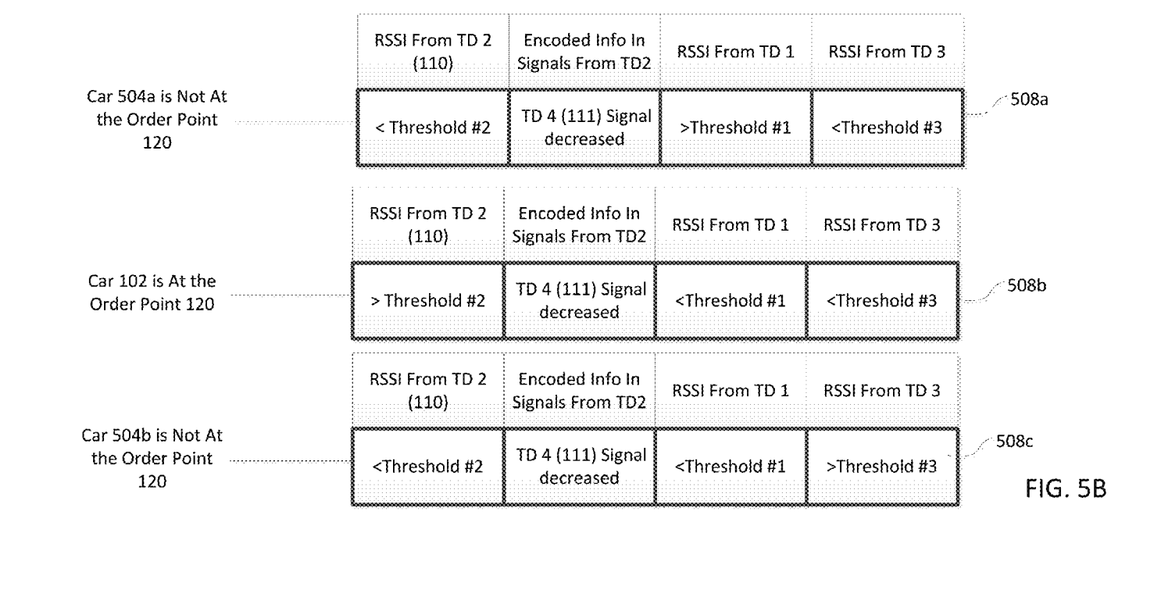
FIG. 5B illustrates that a determination may be made with respect to the cars shown in FIG. 5A.

FIG. 5B illustrates a determination may be made with respect to the cars shown in FIG. 5A. As shown, in the configuration shown in FIG. 5A, the smart ordering device 104 carried by car 102 may determine that it is at the order point 120 because it receives signals from transmitting device (TD 2) 110 with RSSI above the threshold associated with the primary transmitting device 110; the encoded information in the signals received from the primary transmitting device (TD 2) 110 and (TD 4) 111 via link 112 is decreased; and the strength of the signals received from transmitting devices (TD 1) 502a and (TD 3) 502b are below the corresponding thresholds. This indicates that car 102 is blocking the link 112 while being close to transmitting device 110 and away from transmitting devices 502a and 502b. Such an indication means car 102 is at the order point 120 ready to place an order via a smart ordering device 104 in car 102. By comparison, the signal strength as received by cars 502a and 502b indicate that cars 504a and 504b are not within the predetermined range of the primary transmitting device 110 (TD2).

A given smart ordering device 104 may include one or more processor 202 configured to execute computer program components. The computer program components may be configured to enable an expert or user associated with the given smart ordering device 104 to provide functionality attributed herein to smart ordering device 104. By way of non-limiting example, the given smart ordering device 104 may include, but not limited to, a smart phone, a laptop computer, a tablet, a Netbook, a console in a vehicle, a set top box, a dedicated device having functions attributed to the smart ordering device 104 described herein, or any other types of device.

Processor 202 included in the smart ordering device 104 is configured to provide information-processing capabilities in smart ordering device 104. As such, the processor 202 may include one or more of a digital processor, an analog processor, a digital circuit designed to process information, an analog circuit designed to process information, a state machine, and/or other mechanisms for electronically processing information. In some implementations, the processor 202 in the smart ordering device 104 may include a plurality of processing units. These processing units may be physically located within the same device, or may represent the processing functionality of a plurality of devices operating in coordination. The processor 202 may be configured to execute components 204, 206, 208, 210, 212, and 214. The processor 202 in the smart ordering device 104 may be configured to execute components 204, 206, 208, 210, 212, and 214 by software; hardware; firmware; some combination of software, hardware, and/or firmware; and/or other mechanisms for configuring processing capabilities on processor 202.

It should be appreciated that although components 204, 206, 208, 210, 212, and 214 are illustrated in FIG. 2 as being co-located within a single processing unit, in implementations in which processor 202 includes multiple processing units, one or more of components 204, 206, 208, 210, 212, and 214 may be located remotely from the other components. The description of the functionality provided by the different components 204, 206, 208, 210, 212, and 214 described below is for illustrative purposes, and is not intended to be limiting, as any of components 204, 206, 208, 210, 212, and 214 may provide more or less functionality than described. For example, one or more of components 204, 206, 208, 210, 212, and 214 may be eliminated, and some or all of its functionality may be provided by other ones of components 204, 206, 208, 210, 212, and 214. As another example, processor 202 may be configured to execute one or more additional components that may perform some or all of the functionality attributed below to one of components 204, 206, 208, 210, 212, and 214.

It should be further appreciated functionality attributed to components 202, 204, 206, 208, 210, 212, and 214 herein may be distributed among the primary transmitting device 110, the secondary transmitting device 111, the smart ordering device 104, the computer 216, the remote server 118, and any other devices not shown in FIG. 1A, 1B or 1C. For example, it is contemplated that the signal reception component 204, the signal processing component 206 may reside on the primary transmitting device in 110 configurations shown in FIG. 1B and FIG. 1C. As another example, it is contemplated that the threshold component 208 and [?] the order point determination component 210 may reside on computer 126 or the server 118 in the configurations shown in FIG. 1B and FIG. 1C respectively.

Figure 6:
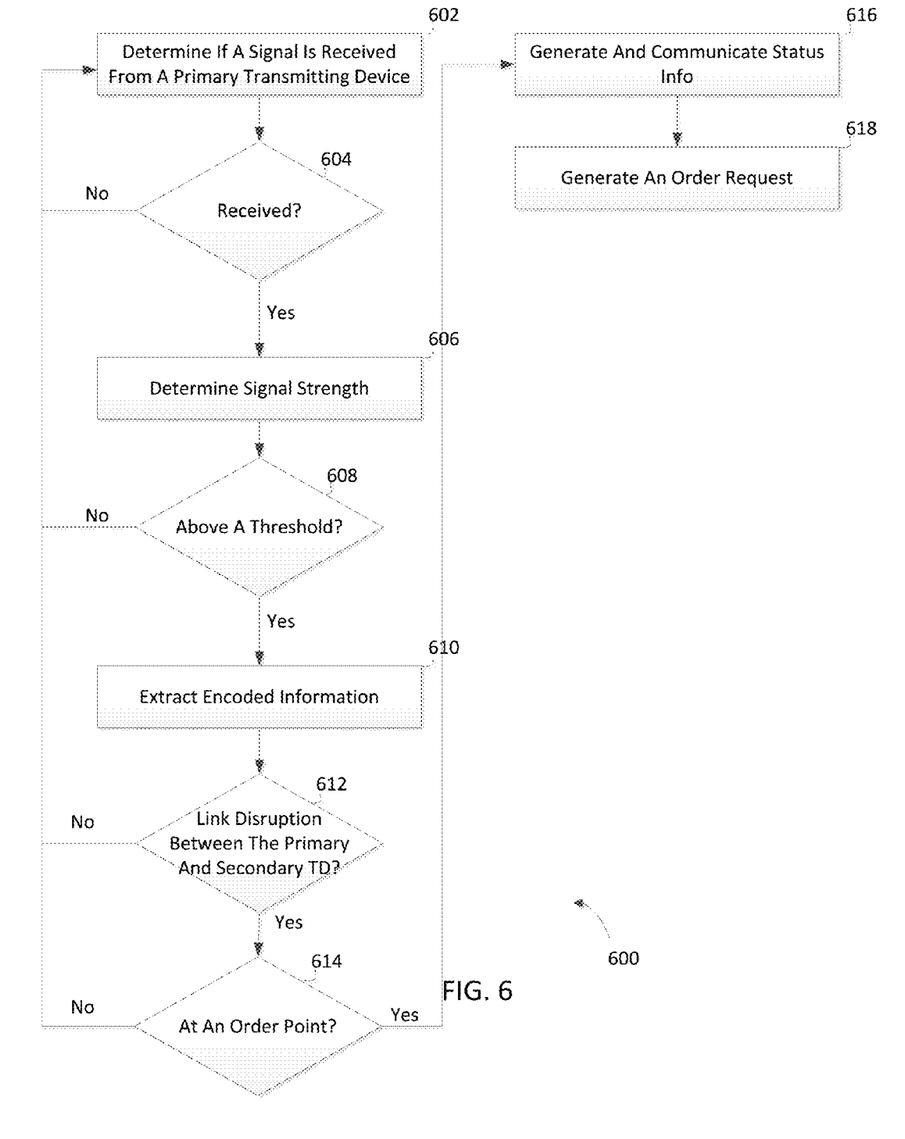
FIG. 6 illustrates one exemplary method for facilitating ordering at an order point using a smart ordering device in accordance with the disclosure.

FIG. 6 illustrates one exemplary method 600 for facilitating ordering at an order point using a smart ordering device in accordance with the disclosure. The operations of method 600 presented below are intended to be illustrative. In some embodiments, method 600 may be accomplished with one or more additional operations not described, and/or without one or more of the operations discussed. Additionally, the order in which the operations of method 600 illustrated in FIG. 6 and described below is not intended to be limiting.

In some embodiments, method 600 may be implemented in one or more processing devices (e.g., a digital processor 202, an analog processor 202, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At operation 602, a determination whether a signal from a primary transmitting device located at an order point is made. In some implementations, operation 602 may be performed by a signal reception component the same as or similar to signal reception component 204 (shown in FIG. 2 and described herein).

At decision block 604, the decision whether a signal from a primary transmitting device located at an order point is made. A shown, if it is determined that a signal is received from the primary transmitting device, the method 600 proceeds to operation 606. In some implementations, decision 604 may be performed by a signal reception component the same as or similar to signal reception component 204 (shown in FIG. 2 and described herein).

At operation 606, the strength of the signal received at operation 604 is determined. In some implementations, operation 606 may be performed by a signal processing component the same as or similar to signal processing component 206 (shown in FIG. 2 and described herein).

At decision block 608, the decision whether the signal strength is above a threshold associated with the primary transmitting device is made. A shown, if it is determined that the strength of the signal received from the primary transmitting device is above the threshold, method 600 proceeds to operation 610. In some implementations, decision 604 may be performed by a threshold component the same as or similar to threshold component 208 (shown in FIG. 2 and described herein).

At operation 610, encoded information in the signals received from the primary transmitting device may be extracted. In some implementations, operation 610 may be performed by a signal processing component the same as or similar to signal processing component 206 (shown in FIG. 2 and described herein).

At decision block 612, a decision whether the encoded information extracted at operation 610 indicates link disruption between the primary and secondary transmitting devices is made. As shown, if it is determined the encoded information in the signals received from the primary transmitting device indicates that the link between the primary and secondary transmitting devices is disrupted, method 600 proceeds to operation 614. In some implementations, decision 612 may be performed by a signal processing component the same as or similar to signal processing component 206 (shown in FIG. 2 and described herein).

At decision block 614, a decision whether the smart ordering device is at the order point may be made. The decision made in the decision block 614 may be based on the distance between the individual transmitting device(s) at the order point and the smart ordering device, and the disruption of linkage between the transmitting devices as determined in decision block 612. In some embodiments, the decision made in decision block 614 may be based at least in part on information regarding other smart ordering devices. For example, if some other smart ordering device is already at the order point broadcasting status information indicating such, a decision that a current smart ordering device is not at the order point ready to place an order may be made. For instance, if multiple smart ordering devices are located in an object such as car passing through the order point, one of the multiple smart ordering devices may be permitted to place an order by the decision block 614, but not others. In some implementations, decision 614 may be performed by an order point determination component the same as or similar to order point determination component 210 (shown in FIG. 2 and described herein).

At operation 616, status information indicating that a smart ordering device is at the order point is generated and communicated to the primary transmitting device. In some implementations, operation 616 may be performed by a status information generation component the same as or similar to status information generation component 212 (shown in FIG. 2 and described herein).

At operation 618, an order request may be generated and communicated to a remote server. In some implementations, operation 618 may be performed by an order component the same as or similar to order component 214 (shown in FIG. 2 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A smart ordering device for facilitating ordering at an order point situated in a driving lane having a first transmitting device and a second transmitting device positioned across the driving lane at the order point, the first transmitting device being configured to receive signals transmitted by the second transmitting device, the device comprising
    one or more physical processors configured by machine-readable instructions to:
        receive a signal from the first transmitting device, the signal including information indicating signal strength between the first and second transmitting devices;
        determine whether the strength of the signal received from the first transmitting device breaches a first threshold associated with the first transmitting device and determine whether the information in the received signal indicates signal strength between the first and second transmitting devices is decreased;

based on the determination that the strength of the signal received from the first transmitting device breaching the first threshold and that the information in the received signal indicating signal strength between the first and second transmitting devices is decreased, determine the smart ordering device is positioned at the order point;

in response to the determination that the smart ordering device is positioned at the order point, generate status information indicating that the device is positioned at the order point and effectuate transferring of the status information to a base station.

2. The smart ordering device of claim 1, wherein the signals transmitted by the second transmitting device to the first transmitting device are radio signals.

3. The smart ordering device of claim 1, wherein the signals transmitting by the second transmitting device to the first transmitting device are optical signals.

4. The smart ordering device of claim 1, wherein the first and second transmitting devices are positioned such that the second transmitting device is closer to the ground than the first transmitting device.

5. The smart ordering device of claim 1, wherein the signal received from the first transmitting device is a radio signal.

6. The smart ordering device of claim 1, wherein the signal received from the first transmitting device is a Bluetooth low energy (BLE) signal.

7. The smart ordering device of claim 1 is further configured to transmit order information to a remote server over a network in response to the determination that the smart ordering device is at the order point.

8. The smart ordering device of claim 1 is further configured to dial a telephone number for a two-way voice communication with an operator associated with the order point in response to the determination that the smart ordering device is at the order point.

9. The smart ordering device of claim, 1, wherein the one or more processors are further configured to receive a signal from a third transmitting device and a signal from a fourth transmitting device, the third and fourth transmitting devices being positioned in proximity to the order point, and wherein the determination that the smart ordering device is at the order point is further based on the signals received from the third and fourth transmitting devices.

10. The system of claim 9, wherein the third transmitting device is positioned one car length in front of the first transmitting device and the fourth transmitting device is positioned one car length behind the first transmitting device.

11. A method for facilitating ordering at an order point situated in a driving lane having a first transmitting device and a second transmitting device positioned across the driving lane at the order point, the first transmitting device being configured to receive signals transmitted by the second transmitting device, the method being implemented in one or more physical processors configured to execute machine-readable instructions, the method comprising:

receiving a signal from the first transmitting device, the signal including information indicating signal strength between the first and second transmitting devices;

determining whether the strength of the received from the first transmitting device breaches a first threshold associated with the first transmitting device and determine whether the information in the received signal indicates signal strength between the first and second transmitting devices is decreased;

based on the determination that the strength of the signal received from the first transmitting device breaching the first threshold and that the information in the received signal indicating signal strength between the first and second transmitting devices is decreased, determining the smart ordering device is positioned at the order point;

in response to the determination that the smart ordering device is positioned at the order point, generate status information indicating that the device is positioned at the order point and effectuate transferring of the status information to a base station.

12. The method of claim 11, wherein the signals transmitted by the second transmitting device to the first transmitting device are radio signals.

13. The method of claim 11, wherein the signals transmitting by the second transmitting device to the first transmitting device are optical signals.

14. The method of claim 11, wherein the first and second transmitting devices are positioned such that the second transmitting device is closer to the ground than the first transmitting device.

15. The method of claim 11, wherein the signal received from the first transmitting device is a radio signal.

16. The method of claim 11, wherein the signal received from the first transmitting device is a Bluetooth low energy (BLE) signal.

17. The method of claim 11, further comprising transmitting order information to a remote server over a network in response to the determination that the smart ordering device is at the order point.

18. The method of claim 11, further comprising dialing a telephone number for a two-way voice communication with an operator associated with the order point in response to the determination that the smart ordering device is at the order point.

19. The method of claim, 11, further comprising receiving a signal from a third transmitting device and a signal from a fourth transmitting device, the third and fourth transmitting devices being positioned in proximity to the order point, and wherein the determination that the smart ordering device is at the order point is further based on the signals received from the third and fourth transmitting devices.

20. The method of claim 19, wherein the third transmitting device is positioned one car length in front of the first transmitting device and the fourth transmitting device is positioned one car length behind the first transmitting device.

* * * * *